United States Patent
Meyer et al.

(10) Patent No.: US 8,384,332 B2
(45) Date of Patent: Feb. 26, 2013

(54) INTEGRATED GEARBOX/ENCODER AND CONTROL SYSTEM

(75) Inventors: Steven M. Meyer, Georgetown, TX (US); Paul Kimelman, Alamo, CA (US)

(73) Assignee: Texas Instruments Incorporated, Dallas, TX (US)

( * ) Notice: Subject to any disclaimer, the term of this patent is extended or adjusted under 35 U.S.C. 154(b) by 385 days.

(21) Appl. No.: 12/642,062

(22) Filed: Dec. 18, 2009

(65) Prior Publication Data

US 2011/0022234 A1    Jan. 27, 2011

Related U.S. Application Data

(60) Provisional application No. 61/139,765, filed on Dec. 22, 2008.

(51) Int. Cl.
*G05B 19/29* (2006.01)
(52) U.S. Cl. ...... 318/602; 318/603; 318/652; 318/400.4
(58) Field of Classification Search .............. 318/3, 11, 318/12, 15, 600, 602, 603, 652, 400.4
See application file for complete search history.

(56) References Cited

U.S. PATENT DOCUMENTS

| | | | | |
|---|---|---|---|---|
| 4,577,142 | A * | 3/1986 | Matsumiya | 318/592 |
| 4,726,738 | A * | 2/1988 | Nakamura et al. | 417/22 |
| 7,375,487 | B2 * | 5/2008 | Miyashita et al. | 318/602 |
| 7,915,849 | B2 * | 3/2011 | Berkey et al. | 318/602 |
| 7,994,749 | B2 * | 8/2011 | Miyashita et al. | 318/652 |

* cited by examiner

*Primary Examiner* — Walter Benson
*Assistant Examiner* — Thai Dinh
(74) *Attorney, Agent, or Firm* — Robert D. Marshall, Jr.; Wade James Brady, III; Frederick J. Telecky, Jr.

(57) ABSTRACT

An integrated gearbox/encoder and control system that includes: a gearbox with an output shaft connected to a mechanical load; a first sensor detecting the rotary position of the output shaft; a motor; a second sensor detecting the rotary position of the motor; and a system controller controlling motive drive to the motor. The two rotary position sensors permit direct determination of gearbox backlash which can be used in motor control. A drive current sensor similarly permits determination of a vibration signature for comparison with a standard.

20 Claims, 4 Drawing Sheets

US 8,384,332 B2

INTEGRATED GEARBOX/ENCODER AND CONTROL SYSTEM

CLAIM OF PRIORITY

This application claims priority under 35 U.S.C. 119(e)(1) to U.S. Provisional Application No. 61/139,765 filed Dec. 22, 2008.

TECHNICAL FIELD OF THE INVENTION

The present invention relates to motor control systems and particularly an integrated gearbox/encoder and control system.

BACKGROUND OF THE INVENTION

It is common practice to combine electric motors and gear reduction systems to reduce system speed to a desired operating point. All gear systems have an internal loss of rotational motion called backlash. Errors created by system backlash make it impossible for a controller to accurately position a load connected to the gearbox if the only source of position information is attached to the motor. A common solution adds an additional position feedback device on the load side as the master position reference. This configuration of motor and sensors is widely used, it does not take full advantage of the information available to improve the control system performance.

SUMMARY OF THE INVENTION

This invention is an integrated gearbox/encoder and control system that includes: a gearbox with a first output shaft that couples to a mechanical load; a first integrated sensor that determines the position of a first output shaft; a motor with a second output shaft; a second sensor that determines the rotary position of the second output; and a system controller coupled to motor drive electronics and the first second sensors.

BRIEF DESCRIPTION OF THE DRAWINGS

These and other aspects of this invention are illustrated in the drawings, in which.

DETAILED DESCRIPTION OF PREFERRED EMBODIMENTS

This invention is an integrated gearbox/encoder and control system. This application describes numerous specific details in order to provide a thorough understanding of the present invention. One skilled in the art will appreciate that one may practice the present invention without these specific details. Additionally, this disclosure does not describe some well known items in detail to not obscure the present invention.

Figure 1:
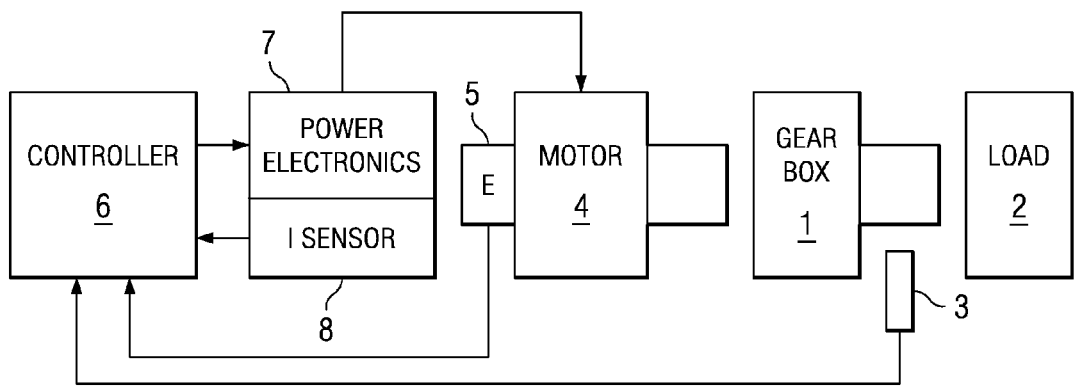
FIG. 1 is a schematic diagram of the invention.

FIG. 1 illustrates the parts of this invention. Gearbox or jack screw 1 has an output shaft coupled to mechanical load 2. FIG. 1 illustrates no particular geometry for gearbox 1. The position of mechanical load 2 is to be controlled. Sensor 3 is integrated into gearbox 1. Sensor 3 may be magnetic, optical or based on strain. Sensor determines the rotary position of the output shaft of gearbox 1. Motor 4 has a rotary position sensor 5 rigidly coupled to the shaft, a controller 6 and motor drive power electronics 7 commanded by controller 6. Motor 4 may be electric, pneumatic or hydraulic. Rotary position sensor 5 may be may be magnetic, optical or based on strain. Controller 6 is preferably a proportional, integral and derivative controller. Current sensor 8 measures the drive current from motor drive electronics 7 to motor 4.

In any similarly configured system the two position sensors providing position information leads to several benefits permitting the creation of new control software. Such new control software would improve performance by incorporating information into the control system model and making adjustments to the velocity, position or toque values.

On startup controller 6 can automatically advance and reverse the motor at slow speed and low torque just enough to cause engagement of the gears in either direction. Controller 6 compares the motion of the motor measured by rotary position sensor 5 to the motion of the load measured by sensor 3. Controller 6 can thus measure the actual mechanical backlash and save this measured value. Controller 6 may periodically measure this backlash. An increase in the measured value of the backlash over time indicates wear in the system. Controller 6 may be programmed with a limit for the wear as a criteria for repair or replacement.

Figure 2:
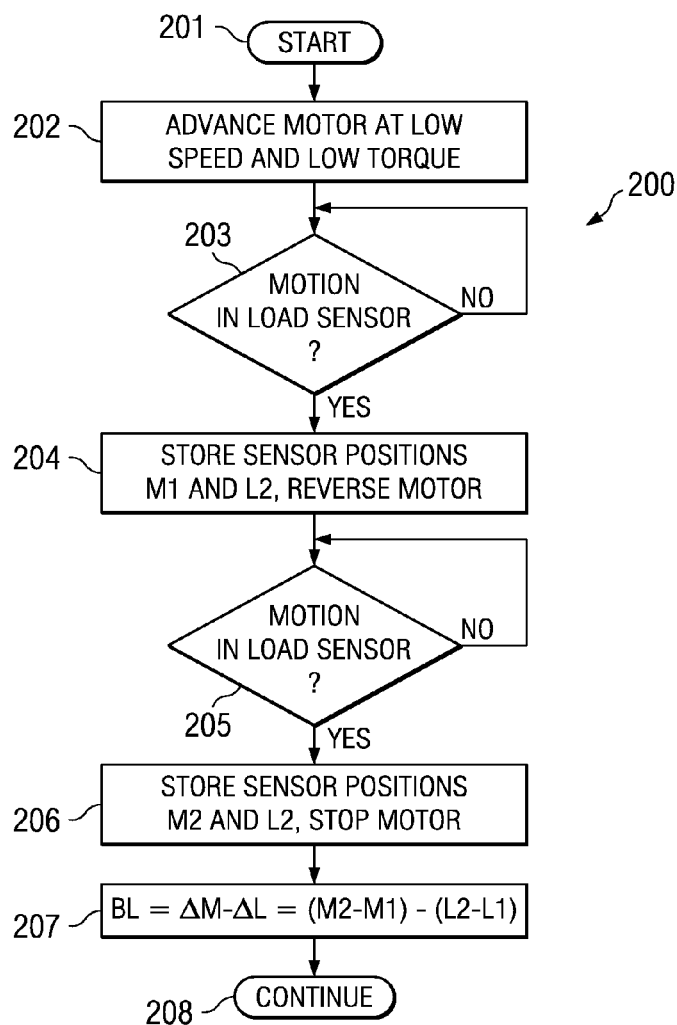
FIG. 2 illustrates the dynamic compensation provided by the disclosed invention.

FIG. 2 illustrates a flow chart example of this backlash determination. Flow chart 200 begins with start block 201. In the preferred embodiment controller 6 makes a backlash determination upon each initial application of electric power, start up. It is also possible to periodically make this backlash determination following start up. Flow chart 200 advances motor 4 at low speed and low torque as commanded by block 202.

Test block 203 determines if motion is detected in load sensor 3. If no motion is detected in load sensor 3 (No at test block 203), then test block 203 repeats. This repeated test takes place while controller 6 continues to control motor 4 as commanded by block 202. If motion is detected in load sensor 3 (Yes at test block 203), then block 204 stores the detected motor position M1 and the detected load position L1 and reverses the drive to motor 4.

Test block 205 determines if motion is detected in load sensor 3. If no motion is detected in load sensor 3 (No at test block 205), then test block 205 repeats. This repeated test takes place while controller 6 continues to control motor 4 in reverse as commanded by block 204. If motion is detected in load sensor 3 (Yes at test block 205), then block 206 stores the detected motor position M2 and the detected load position L2 and stops the drive to motor 4.

Block 207 calculates the backlash. This backlash calculation is based upon the difference in the change in the motor sensor 5 detected positions and the change in the load sensor 3 detected position. Thus the backlash BL is give by:

$$BL = \Delta M - \Delta L$$
$$= (M2 - M1) - (L2 - L1)$$

The control of flow chart 200 continues via continue block 208. This determined backlash can be stored and used in later control as outlined below.

Figure 3:
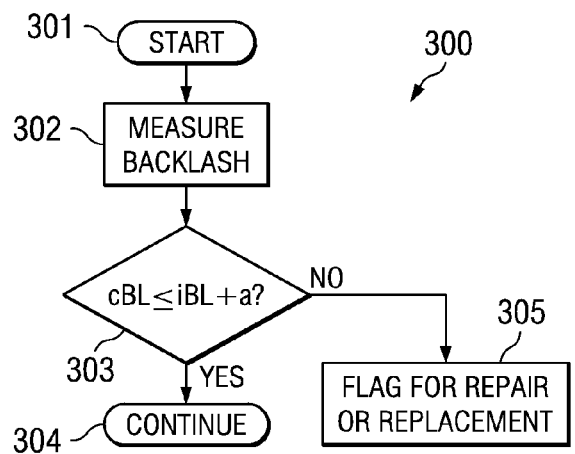
FIG. 3 illustrates a flow chart of an embodiment of the use of measured backlash of this invention.

FIG. 3 illustrates flow chart 300 of an embodiment of the use of measured backlash in this invention. Flow chart 300 begins with start block 301. Block 302 performs a backlash measurement. This backlash measurement could be made as illustrated in FIG. 2. As previously noted, this backlash measurement could be preformed upon each initial application of electric power to controller 6 or at periodic intervals during system operation.

Test block 302 compares the current measured backlash cBL with a prior stored initial backlash iBL. Test block 302 determines whether the current backlash cBL is less than or equal to the sum of the initial backlash iBL and an empirically determined constant α. If this is true (Yes at test block 303), flow chart 300 continues at continue block 304. If this is not true (No at text block 303), then block 305 flags a remedial operation such as repair or replacement. As previously noted, such an increase in the current measured backlash above an initial backlash indicates wear in the drive system indicating a need of remedial action.

Figure 4:
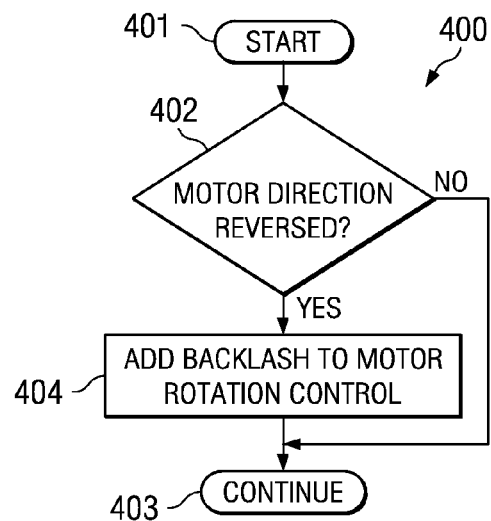
FIG. 4 illustrates a flow chart showing another use of the measured backlash of this invention.

FIG. 4 illustrates flow chart 400 showing another use of the measured backlash. Flow chart 400 begins at start block 401. Test block 402 determines whether controller 6 orders a motor direction reverse. This test takes place while controller 6 continues to control motor 4. If there is no direction reverse (No at text block 402), then flow chart 400 continues at continue block 403. If controller 6 orders a motor direction reversal (Yes at text block 403), then block 404 alters the control program. Block 404 adds the current measured backlash to the position term in the control program of controller 6. This addition of the backlash amount accounts for the amount of rotation of motor 4 before motion at the output of gearbox 1. This alternation of the control program of controller 6 permits controlled operation through the backlash of the motor reversal.

Figure 5:
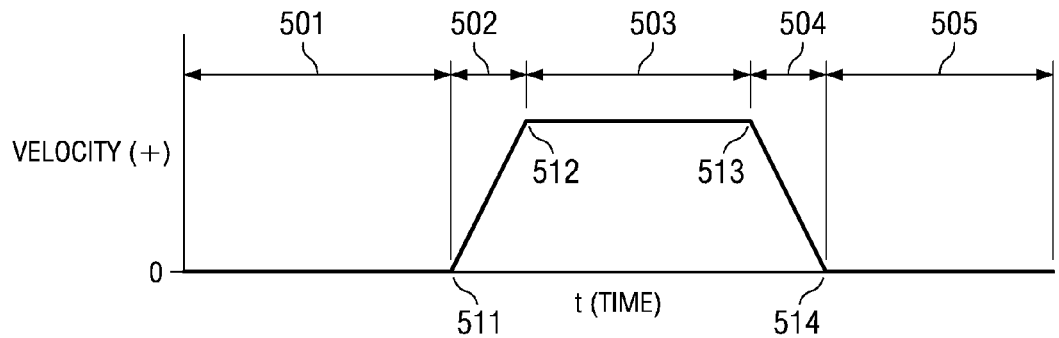
FIG. 5 illustrates an example of a prior art control sequence commanded by a controller.

In any motion system there are inflection points where the acceleration force changes from a non-zero value to a zero value. FIG. 5 illustrates an example of a prior art control sequence commanded by controller 6. FIG. 5 illustrates a velocity profile over time. Region 501 is before the motor is controlled. During region 501 the position is constant and both the velocity and acceleration are 0. Region 502 is an acceleration region. During region 502 the load position changes. The load velocity is increasing and the acceleration is greater than 0. Region 502 represents an initial acceleration of the load. FIG. 5 illustrates a constant acceleration by the constant velocity slope. Such a constant acceleration is not required. The load acceleration may vary during region 502. Region 503 represents a constant velocity region. The load position changes continually, the load velocity is constant and the load acceleration is 0. Region 504 is a deceleration region. During region 504 the load position changes. The load velocity is decreasing and the acceleration is less than 0. Region 504 represents deceleration of the load. FIG. 5 illustrates a constant deceleration by the constant velocity slope. Such a constant deceleration is not required. The load deceleration may vary during region 504. Region 505 is after the controlled operation. In region 505 the position is constant and the velocity and acceleration are 0.

FIG. 5 illustrates several inflection points of changing acceleration. The first of these is at point 511 where the acceleration changes from 0 to a non-zero positive value. When the load has been accelerated up to a constant target speed, the acceleration then changes from non-zero to 0 with the load running at the desired speed. This occurs at point 512. At point 513 the acceleration changes from 0 to a non-zero negative value. Finally at point 514 the acceleration changes from a negative value to 0. Following point 514 the load is a rest at a constant position with both the velocity and acceleration 0.

At these inflection points 511, 512, 513 and 514 gearbox 1 becomes unloaded. Normally there is some instability in the control system usually resulting in momentary overshoot. Generally there is a high impact load called jerk that can damage gear teeth as the gears return to a meshed state. Motor control can be improved by taking into account the dynamic property of the backlash by adjusting the torque and speed loops to smoothly engage the gears as the system transitions through inflection points, thereby eliminating stress.

In the displacement profile illustrated in FIG. 5 the inflection points are easy to identify. When the system is at rest, zero velocity, it is impossible to determine the engagement of the gears. As the motor starts, backlash is immediately taken up by the rotation of the motor causing jerk or impact stress as the gears begin to move. When the system stops accelerating, and tries to achieve constant speed, another inflection point occurs during which the load can overrun slightly and the gears become momentarily disengaged. In this way, every time acceleration changes from a zero to a non-zero state, inflection points occur which present abnormal stresses to the gears and which cannot be adequately compensated in the control system.

Figure 6:
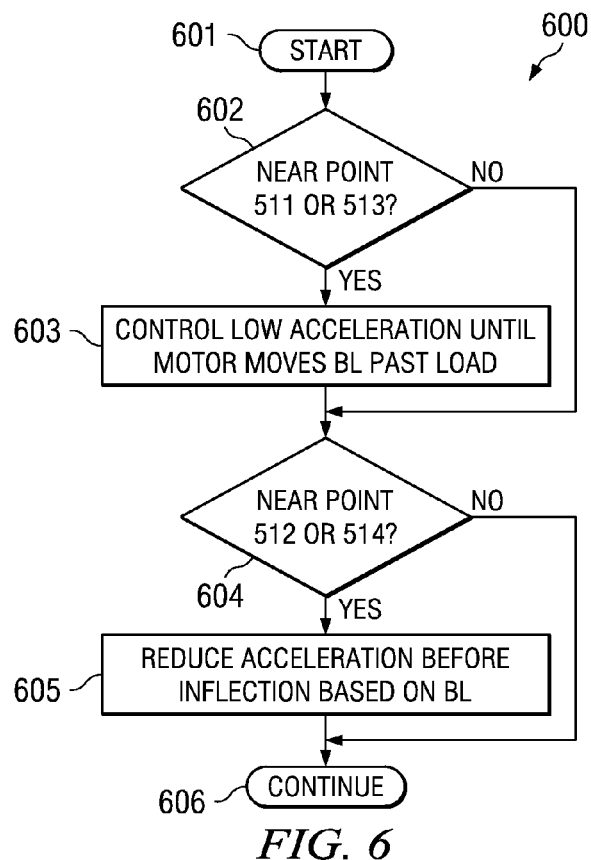
FIG. 6 illustrates a flow chart of an embodiment of the invention including a second control loop around two feedback devices.

FIG. 6 illustrates flow chart 600 of a proposed embodiment of the invention including a second control loop around the two feedback devices. This permits precise regulation of the stress created by the backlash in its various states. Flow chart 600 begins with start block 601. Test block 602 determines if the control profile is near points 511 or 513. Each of these control points are where the acceleration changes from zero to non-zero. If this is true (Yes at test block 602), then control switches from the programmed command profile such as illustrated in FIG. 5 to a second control loop. Block 603 controls motor 4 at a low acceleration until the position change detected by motor sensor 5 moves an amount corresponding to the previously measured backlash BL past the position change detected by load sensor 3. Block 603 exits the second control loop and returns to the initial command profile upon reaching this point. Reaching this point assures that the backlash is wound out of gearbox 1. Command control can proceed with the assurance that there will be a minimal jerk within gearbox 1.

Whether test block 602 did not detect proximity to points 511 or 513, or block 603 completes, test block 604 determines if the control profile is near points 512 or 514. Each of these control points are where the acceleration changes from non-zero to zero. If this is true (Yes at test block 604), then control switches from the programmed command profile such as illustrated in FIG. 5 to a second control loop. Block 604 controls motor 4 to reduce the acceleration upon nearing the inflection point 512 or 514. The interval before the inflection point for acceleration reduction depends on the amount of backlash BL. A large BL requires a large offset from the inflection point. A small BL requires a smaller offset. This torque reduction reduces or eliminates the torque overrun upon reaching a steady state condition reducing the jerk upon remeshing the gears. Whether test block 604 did not detect proximity to points 512 or 514, or block 604 completes, control continues with the main command profile at continue block 606.

Normal torque control in a motor drive involves providing sufficient current to allow the motor to turn the attached load. Since most motor control systems involve monitoring of current the motor current is readily available to the control system. FIG. 1 illustrates current sensor 8 as part of motor drive electronics 7. Mechanical loads that have eccentric properties, such as cams or rotary knives, require current compensation to maintain commanded speed.

By precisely measuring the torque loop waveforms via current sensor 8 it is possible to measure vibration signatures in the gearbox. Subtle vibration in the gears are commonly described in manufacturer's specifications as torque ripple. Since the torque ripple of a gear system is a function of the mechanical construction details, a signature waveform will appear as noise in the torque loop of the control system.

If the vibration levels exceed some determined normal operating range, it would indicate an impending failure in the mechanism. This out of tolerance condition can be reported through the control system and acted upon as a preventive maintenance event instead of a catastrophic failure.

Figure 7:
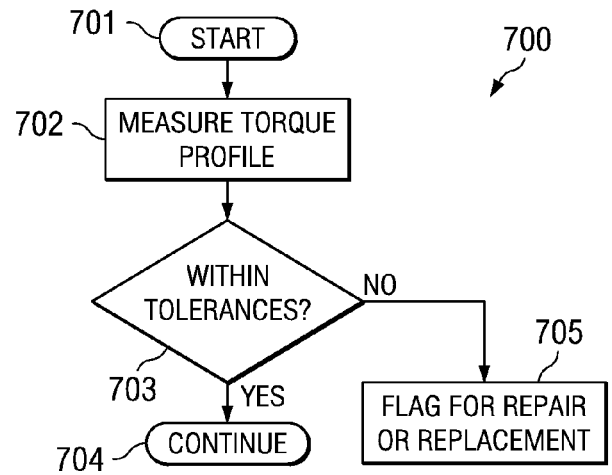
FIG. 7 illustrates a flow chart of an embodiment of the use of a measured vibration profile in this invention.

FIG. 7 illustrates flow chart 700 of an embodiment of the use of measured vibration profile in this invention. Flow chart 700 begins with start block 701. Block 702 performs a torque profile measurement.

Test block 703 compares the current measured torque profile with a prior stored initial torque profile. Test block 703 determines whether the torque profile is within predetermined tolerances of the prior torque profile. If this is true (Yes at test block 703), flow chart 700 continues at continue block 704. If this is not true (No at test block 703), then block 705 flags a remedial operation such as repair or replacement. As previously noted, this out of tolerance torque profile indicates an impending failure.

Gear reducers and other rolling mechanisms have a certain deflection characteristic called torsion which is intrinsic to the materials used in their design. Over time, repeated cycling will load the materials and they will fatigue. This fatigue is a unique material property which substantially reduces the deflection of the parts. By comparing the measured flexure of the system and observing the change in the deflection of the gear train, a threshold of performance can be established that indicates that catastrophic failure may be imminent. Thus the measurement of deflection by the control system comparing the motor position with the gear system output position leads to a new and novel means of preventing fatigue failure in the gear components.

Figure 8:
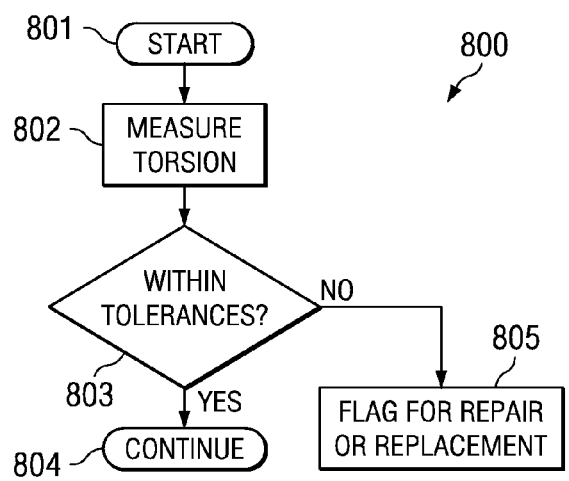
FIG. 8 illustrates flow chart 800 of an embodiment of the use of measured gearbox flexure/deflection in this invention.

FIG. 8 illustrates flow chart 800 of an embodiment of the use of measured gearbox flexure/deflection in this invention. Flow chart 800 begins with start block 801. Block 802 performs a flexure/deflection measurement.

Test block 803 compares the current measured flexure/deflection with a prior stored initial flexure/deflection. Test block 803 determines whether the flexure/deflection is within predetermined tolerances of the prior flexure/deflection. If this is true (Yes at test block 803), flow chart 800 continues at continue block 804. If this is not true (No at text block 803), then block 805 flags a remedial operation such as repair or replacement. As previously noted, this out of tolerance flexure/deflection indicates an impending failure.

What is claimed is:

1. An integrated gearbox/encoder and control system, comprising:
    a gearbox with a first output shaft that couples to a mechanical load;
    a first sensor integrated into said gearbox, said first sensor detecting a rotary position of said first output shaft of said gearbox;
    a motor with a second output shaft that couples to said gearbox;
    motor drive electronics connected to said motor controlling motive power supplied to said motor to control motion of said motor;
    a second sensor coupled to said second output shaft of said motor detecting rotary position of said second output shaft of said motor; and
    a system controller connected to said motor drive electronics, said first sensor and said second sensor, said system controller controlling motion of said motor through said motor drive electronics, said system controller operable to measure a gearbox backlash by
        controlling said motor to advance at a low velocity and a low acceleration until detecting motion at said first sensor,
        thereafter storing a first detected rotary position of said first sensor and a first detected rotary position of said second sensor,
        controlling said motor to reverse direction and advance at said low velocity and said low acceleration until detecting motion at said first sensor,
        thereafter storing a second detected rotary position of said first sensor and a second detected rotary position of said second sensor, and
        calculating a backlash from a difference between a difference between said second and first detected rotary positions of said second sensor and a difference between said second and first detected rotary positions of said first sensor.

2. The integrated gearbox/encoder and control system of claim 1, wherein:
    said system controller is operable to periodically measure said gearbox backlash.

3. The integrated gearbox/encoder and control system of claim 1, wherein:
    said system controller is operable to measure said gearbox backlash once each initial application of electric power.

4. The integrated gearbox/encoder and control system of claim 1, wherein:
    said system controller is further operable to
        compare said measured gearbox backlash to a standard,
        continue system controller operation upon a first result of said comparison, and
        abort system controller operation and request remedial action upon a second result of said comparison opposite to said first result.

5. The integrated gearbox/encoder and control system of claim 4, wherein:
    said system controller is operable to
        compare said measured gearbox backlash to a sum of an initial measured backlash and an empirically determined constant,
        said first result of said comparison is said backlash less than or equal to said sum, and
        said second result of said comparison is said backlash greater than said sum.

6. The integrated gearbox/encoder and control system of claim 1, wherein:
 said system controller is further operable to
  detect commanded direction reversal of said motor, and
  upon detection of a commanded direction reversal of said motor add said measured gearbox backlash to a calculated position control term in controlling motion of said motor.

7. The integrated gearbox/encoder and control system of claim 1, wherein:
 said system controller is further operable to
  detect a commanded change in control of said motor from zero acceleration to non-zero acceleration, and
  upon detection of said commanded change in control of said motor from zero acceleration to non-zero acceleration, command said motor at low acceleration until said second sensor indicates an movement corresponding to said measured gearbox backlash greater than said first sensor indicates movement.

8. The integrated gearbox/encoder and control system of claim 1, wherein:
 said system controller is further operable to
  detect commanded change in control of said motor from non-zero acceleration to zero acceleration, and
  upon detection of said commanded change in control of said motor from non-zero acceleration to zero acceleration, command said motor at reduced acceleration for an amount before said commanded change in control of said motor from non-zero acceleration to zero acceleration corresponding to said measured gearbox backlash.

9. A integrated gearbox/encoder and control system comprising:
 a gearbox with a first output shaft that couples to a mechanical load;
 a first sensor integrated into said gearbox, said first sensor detecting a rotary position of said first output shaft of said gearbox;
 a motor with a second output shaft that couples to said gearbox;
 motor drive electronics connected to said motor controlling motive power supplied to said motor to control motion of said motor;
 a second sensor coupled to said second output shaft of said motor detecting rotary position of said second output shaft of said motor;
 a current sensor connected to said motor drive electronics detecting drive current from said motor drive electronics to said motor; and
 a system controller connected to said motor drive electronics, said first sensor and said second sensor, said system controller controlling motion of said motor through said motor drive electronics, said system controller operable to
  determine a vibration signature for said motor from said drive current,
  compare said vibration signature to a standard,
  continue system controller operation upon a first result of said comparison, and
  abort system controller operation and request remedial action upon a second result of said comparison opposite to said first result.

10. A integrated gearbox/encoder and control system comprising:
 a gearbox with a first output shaft that couples to a mechanical load;
 a first sensor integrated into said gearbox, said first sensor detecting a rotary position of said first output shaft of said gearbox;
 a motor with a second output shaft that couples to said gearbox;
 motor drive electronics connected to said motor controlling motive power supplied to said motor to control motion of said motor;
 a second sensor coupled to said second output shaft of said motor detecting rotary position of said second output shaft of said motor; and
 a system controller connected to said motor drive electronics, said first sensor and said second sensor, said system controller controlling motion of said motor through said motor drive electronics, said system controller operable to
  determine a deflection characteristic for said motor from said first sensor and said second sensor,
  compare said deflection characteristic to a standard,
  continue system controller operation upon a first result of said comparison, and
  abort system controller operation and request remedial action upon a second result of said comparison opposite to said first result.

11. A method of motor control comprising the steps of:
 detecting a rotary position of an output shaft of a gearbox connected to a load;
 driving an input shaft of the gearbox with a motor;
 supplying motive power to the motor;
 detecting rotary position of the input shaft of the gearbox;
 controlling the motive power supplied to the motor in conjunction with the detected rotary positions of the gearbox input shaft and output shaft to control position of the load; and
 measuring a gearbox backlash by
  controlling said motor to advance at a low velocity and a low acceleration until detecting motion at said first sensor,
  thereafter storing a first detected rotary position of said first sensor and a first detected rotary position of said second sensor,
  controlling said motor to reverse direction and advance at said low velocity and said low acceleration until detecting motion at said first sensor,
  thereafter storing a second detected rotary position of said first sensor and a second detected rotary position of said second sensor, and
  calculating a backlash from a difference between a difference between said second and first detected rotary positions of said second sensor and a difference between said second and first detected rotary positions of said first sensor.

12. The method of claim 11, wherein:
 said step of measuring a gearbox backlash includes periodically measuring the gearbox backlash.

13. The method of claim 12, wherein:
 said step of periodically measuring the gearbox backlash includes measuring the gearbox backlash once each initiation of the method.

14. The method of claim 11, further comprising the steps of:
 comparing the measured gearbox backlash to a standard;
 continuing operation upon a first result of the comparison; and
 aborting operation and requesting remedial action upon a second result of the comparison opposite to the first result.

15. The integrated gearbox/encoder and control system of claim 14, wherein:
   said step of comparing the measured gearbox backlash to a standard compares the measured gearbox backlash to a sum of an initial measured backlash and an empirically determined constant;
   said first result of said comparison is the backlash less than or equal to said sum, and
   said second result of said comparison is the backlash greater than said sum.

16. The method of claim 11, further comprising the steps of:
   detecting a commanded direction reversal of the motor; and
   upon detection of a commanded direction reversal of the motor adding the measured gearbox backlash to a calculated position control term in controlling motion of the load.

17. The method of claim 11, further comprising the steps of:
   detecting a commanded change in control of the motor from zero acceleration to non-zero acceleration; and
   upon detection of the commanded change in control of the motor from zero acceleration to non-zero acceleration, commanding the motor at low acceleration until the detected rotary position of the input shaft of the gearbox indicates a movement corresponding to said measured gearbox backlash greater than the detected rotary of the output shaft of the gearbox indicates movement.

18. The method of claim 11, further comprising the steps of:
   detecting a commanded change in control of the motor from non-zero acceleration to zero acceleration; and
   upon detection of a commanded change in control of the motor from non-zero acceleration to zero acceleration, commanding the motor at reduced acceleration for an amount before the commanded change in control of the motor from non-zero acceleration to zero acceleration corresponding to the measured gearbox backlash.

19. A method of motor control comprising the steps of:
   detecting a rotary position of an output shaft of a gearbox connected to a load;
   driving an input shaft of the gearbox with a motor;
   supplying motive power to the motor;
   detecting rotary position of the input shaft of the gearbox;
   controlling the motive power supplied to the motor in conjunction with the detected rotary positions of the gearbox input shaft and output shaft to control position of the load;
   detecting drive current of the motor;
   determining a vibration signature for the motor from the detected drive current;
   comparing the vibration signature to a standard;
   continuing operation upon a first result of the comparison; and
   aborting system operation and requesting remedial action upon a second result of the comparison opposite to the first result.

20. A method of motor control, comprising the steps of:
   detecting a rotary position of an output shaft of a gearbox connected to a load;
   driving an input shaft of the gearbox with a motor;
   supplying motive power to the motor;
   detecting rotary position of the input shaft of the gearbox;
   controlling the motive power supplied to the motor in conjunction with the detected rotary positions of the gearbox input shaft and output shaft to control position of the load;
   determining a deflection characteristic for the motor from the detected rotary positions of the input and output of the gearbox;
   comparing the deflection characteristic to a standard;
   continuing operation upon a first result of the comparison; and
   aborting operation and requesting remedial action upon a second result of the comparison opposite to the first result.

* * * * *